United States Patent
Oswald et al.

(10) Patent No.: US 7,700,034 B2
(45) Date of Patent: Apr. 20, 2010

(54) SLIP CONTAINING ZIRCONIUM DIOXIDE AND ALUMINUM OXIDE AND SHAPED BODY OBTAINABLE THEREFROM

(75) Inventors: Monika Oswald, Hanau (DE); Klaus Deller, Hainburg (DE); Wolfgang Kollenberg, Brühl (DE); Dieter Nikolay, Bell (DE)

(73) Assignee: Evonik Degussa GmbH, Essen (DE)

( * ) Notice: Subject to any disclaimer, the term of this patent is extended or adjusted under 35 U.S.C. 154(b) by 5 days.

(21) Appl. No.: 11/913,412

(22) PCT Filed: Apr. 27, 2006

(86) PCT No.: PCT/EP2006/061864

§ 371 (c)(1),
(2), (4) Date: Jun. 18, 2008

(87) PCT Pub. No.: WO2006/117318

PCT Pub. Date: Nov. 9, 2006

(65) Prior Publication Data

US 2008/0258358 A1    Oct. 23, 2008

(30) Foreign Application Priority Data

May 4, 2005    (DE) .................... 10 2005 020 781

(51) Int. Cl.
| B28B 1/00 | (2006.01) |
| B28B 3/00 | (2006.01) |
| B28B 5/00 | (2006.01) |
| C04B 33/32 | (2006.01) |
| C04B 33/36 | (2006.01) |
| C04B 35/64 | (2006.01) |

(52) U.S. Cl. .................... 264/651; 501/103; 501/104
(58) Field of Classification Search .................. 264/651; 501/103–104
See application file for complete search history.

(56) References Cited

U.S. PATENT DOCUMENTS

| 3,630,754 A | * | 12/1971 | Wayne .................... 426/430 |
| 4,525,464 A | * | 6/1985 | Claussen et al. ............. 501/103 |
| 4,587,225 A | * | 5/1986 | Tsukuma et al. ............. 501/105 |
| 4,772,576 A | * | 9/1988 | Kimura et al. ............. 501/105 |
| 4,786,292 A | * | 11/1988 | Janz et al. .................... 51/293 |
| 5,183,610 A | * | 2/1993 | Brog et al. .................... 501/105 |

FOREIGN PATENT DOCUMENTS

DE    34 45 948    7/1985

OTHER PUBLICATIONS

Bach, J. P., et al., "Fabrication and Characterization of Zirconia-Toughened Alumina Obtained by Inorganic and Organic Precursors", Journal of Materials Science UK, vol. 24, No. 8, pp. 2711-2721, 1989.

* cited by examiner

*Primary Examiner*—Khanh Nguyen
*Assistant Examiner*—Matthew Hoover
(74) *Attorney, Agent, or Firm*—Oblon, Spivak, McClelland, Maier & Neustadt, L.L.P.

(57) ABSTRACT

Slip containing at least one aluminium oxide powder and at least one unstabilized zirconium dioxide powder, wherein
a) the zirconium dioxide powder
  i) has a mean particle diameter of less than 300 nm,
  ii) shows only the monoclinic phase and the tetragonal phase in the X-ray diffraction pattern, with the proportion of tetragonal phase at room temperature being from 20 to 70%, and
  iii) is present in a proportion of from 2 to 20% by weight, based on the total amount of the slip,
b) the aluminium oxide powder
  i) has a mean particle diameter of more than 300 nm and
  ii) is present in a proportion of from 80 to 98% by weight, based on the total amount of the slip, and
c) the solids content, as the sum of aluminium oxide and zirconium dioxide, is from 50 to 85% by weight, based on the total amount of the slip.

13 Claims, No Drawings

SLIP CONTAINING ZIRCONIUM DIOXIDE AND ALUMINUM OXIDE AND SHAPED BODY OBTAINABLE THEREFROM

The invention relates to a slip containing zirconium dioxide and aluminium oxide and also its production. The invention further relates to a shaped body obtainable from the slip and its use.

Tools and construction materials made of aluminium oxide reinforced with zirconium dioxide have been known for a long time. They have high strengths and fracture toughnesses. They are produced from powders based on zirconium oxide/aluminium oxide by mechanical mixing using a ball mill or the like. The homogeneous distribution of the powders has been found to be problematical. The shaped bodies obtained display problems in terms of their strength.

Furthermore, processes in which mixed precipitates are obtained by neutralization and coprecipitation from a solution containing zirconium and aluminium components and are then calcined and pulverized have been proposed. However, it has been found that even for the same composition of the starting components, powders having different physicochemical properties are obtained.

The production of materials composed of aluminium oxide reinforced with zirconium dioxide from a slip containing zirconium dioxide is likewise known.

Zirconium oxide-aluminium oxide materials of the prior art often do not have the desired toughness and hardness.

The technical object of the invention is therefore to provide a slip which allows the production of shaped bodies having a high toughness and a high hardness.

A further object of the invention is to provide a process for producing this slip.

A further object of the invention is to provide a shaped body which can be produced using this slip.

The invention provides a slip containing at least one aluminium oxide powder and at least one unstabilized zirconium dioxide powder, in which a) the zirconium dioxide powder
   i) has a mean particle diameter of less than 300 nm,
   ii) shows only the monoclinic phase and the tetragonal phase in the X-ray diffraction pattern, with the proportion of tetragonal phase at room temperature being from 20 to 70%, and
   iii) is present in a proportion of from 2 to 20% by weight, based on the total amount of the slip,
b) the aluminium oxide powder
   i) has a mean particle diameter of more than 300 nm and
   ii) is present in a proportion of from 80 to 98% by weight, based on the total amount of the slip, and
c) the solids content, as the sum of aluminium oxide and zirconium dioxide, is from 50 to 85% by weight, based on the total amount of the slip.

The zirconium dioxide powder of the present invention is unstabilized, i.e. the elements known to those skilled in the art which stabilize zirconium dioxide, for example Y, Ca, Mg or titanium, are not present in the powder or are present only in such small amounts that they produce no stabilizing effect. The powder has a zirconium dioxide content of at least 97% by weight, in general at least 99% by weight. In addition, it can contain up to 2.5% by weight of hafnium dioxide as accompanying component.

For the purposes of the present invention, the median is the $d_{50}$ of the volume-weighted particle size distribution. According to the present invention, the median size of the zirconium dioxide particles in the slip of the invention is less than 300 nm. The median of the particle size distribution can be based on a trimodal, bimodal or monomodal distribution of the particles, with a monomodal distribution of the zirconium dioxide particles in the slip being particularly preferred. The $d_{50}$ is preferably in the range from 70 to 200 nm.

For the present purposes, particles are individual particles, aggregates and/or agglomerates which are isolated from one another, as can occur in the slip. The zirconium dioxide powder is preferably in the form of aggregated primary particles. Here, the term primary particles refers to particles which cannot be broken up further without breaking chemical bonds.

The zirconium dioxide in the slip of the invention shows only the monoclinic phase and the tetragonal phase in the X-ray diffraction pattern; a cubic phase is not detectable. The proportion of tetragonal phase at room temperature in the slip is from 20 to 70%, and a range from 30 to 50% can be particularly preferred.

The BET surface area of the zirconium dioxide powder present in the slip of the invention is preferably $60\pm15$ m$^2$/g.

Furthermore, it can be advantageous for the particles of the zirconium dioxide powder to have only a small number of pores or be completely free of pores.

The aluminium oxide powder present in the slip of the invention has a mean particle diameter of more than 300 nm. The upper limit to the mean diameter is preferably less than 20 μm and particularly preferably less than 5 μm.

The aluminium oxide is advantageously present in unaggregated or only slightly aggregated form. For the present purposes, slightly aggregated means that individual particles have grown together but the predominant proportion is present in the form of individual, unaggregated particles.

The BET surface area of the aluminium oxide powder present in the slip of the invention is preferably from 0.1 to 15 m$^2$/g.

Furthermore, it has been found to be advantageous for the aluminium oxide to have an alpha-aluminium oxide content of at least 95%.

The liquid phase of the slip of the invention can be water, one or more organic solvents or a single-phase mixture of water and organic solvents. The liquid phase advantageously consists completely or predominantly of water.

Here, the term predominantly means that the slip of the invention can additionally contain up to 10% by weight, based on the slip, of pH-regulating additives and/or surface-modifying additives.

For the purposes of the invention, surface-modified means that at least part of the hydroxy groups present on the surface of the zirconium dioxide powder have reacted with a surface modifier to form a chemical bond. The chemical bond is preferably a covalent, ionic or coordinate bond between the surface modifier and the particle, but can also be a hydrogen bond.

For the present purposes, a coordinate bond means complex formation. Thus, for example, an acid/base reaction of the Brönsted or Lewis type, complex formation or esterification can take place between the functional groups of the modifier and the particle.

The functional group is preferably a carboxylic acid group, an acid chloride group, an ester group, a nitrile or isonitrile group, an OH group, an SH group, an epoxide group, an anhydride group, an acid amide group, a primary, secondary or tertiary amino group, an Si—OH group, a hydrolysable radical of a silane or a C—H acid group as in beta-dicarbonyl compounds. The surface modifier can also comprise more than one such functional group, as in, for example, betaines, amino acids, EDTA.

It can be particularly advantageous for 3-aminopropytriethoxysilane (AMEO), ammonium salts of polycarboxylic acids, for example Dolapix CE64 (from Zschimmer & Schwarz) and/or tetraalkylammonium hydroxides such as tetramethylammonium hydroxide or tetraethylammonium hydroxide to be used for surface modification of the zirconium dioxide powder.

The invention further provides a process for producing the slip of the invention, in which
a) a dispersion of zirconium dioxide powder which has a zirconium dioxide content of from 30 to 75% by weight and optionally contains up to 10% by weight of pH-regulating additives and/or surface-active additives and in which the particles have a mean diameter of less than 300 nm is added
b) continuously or in portions under dispersing conditions to
c) a dispersion of aluminium oxide powder which has an aluminium oxide content of from 70 to 90% by weight, optionally contains up to 10% by weight of pH-regulating additives and/or surface-active additives and has a mean particle diameter of more than 300 nm,
d) wherein the amounts of aluminium oxide and zirconium dioxide are selected so that the ratio of zirconium dioxide to aluminium oxide is from 2:98 to 20:80 and
e) the solids content, as the sum of aluminium oxide and zirconium dioxide, is from 50 to 85% by weight, based on the total amount of the slip.

As zirconium dioxide powders, preference is given to using powders which have been produced flame-pyrolytically. For the present purposes, the term flame-pyrolytically means that the powder has been obtained by means of flame hydrolysis or flame oxidation. Flame hydrolysis is, for example, the formation of zirconium dioxide by combustion of zirconium tetrachloride in a hydrogen/oxygen flame. Flame oxidation is, for example, the formation of zirconium dioxide by combustion of an organic zirconium dioxide precursor in a hydrogen/oxygen flame.

For example, a zirconium mixed oxide powder having the following features can preferably be used:
mean primary particle diameter: <20 nm, preferably 10-16 nm, particularly preferably 12-14 nm;
Aggregate parameters:
mean area: <10 000 nm 2, preferably 5000-8000 nm$^2$,
mean equivalent circle diameter: <100 nm, preferably 50-90 nm,
mean aggregate circumference: <700 nm, preferably 450-600 nm,
mean, maximum aggregate diameter: <150 nm, particularly preferably 100-150 nm,
mean, minimum aggregate diameter: <100 nm, particularly preferably 60-90 nm.

The production of such a powder is described in the German patent application number 102004061698.1 filed on 22 Dec. 2004. The contents of this patent application are fully incorporated by reference into the present patent application.

The zirconium dioxide dispersion used for producing the slip of the invention should have a good stability towards sedimentation, caking and thickening. Such a dispersion can be obtained by dispersing the powder by means of a high-energy mill. A dispersion produced in this way is pourable for at least 1 month, in general at least 6 months, at room temperature without prior redispersion being necessary. Furthermore, its viscosity in the shear rate range from 1 to 1000 s$^{-1}$ and at a temperature of 23° C. is less than 1000 mPas and particularly preferably less than 100 mPas. The dispersion preferably has a monomodal distribution of the particle sizes.

In the process, a predispersion is divided into at least two substreams, these substreams are placed under a pressure of at least 500 bar, preferably from 500 to 1500 bar, particularly preferably from 2000 to 3000 bar, in a high-energy mill, depressurized through a nozzle and allowed to impinge on one another in a gas- or liquid-filled reaction space and thus milled and the dispersion is then optionally brought to the desired content by means of further dispersion medium.

The process can be carried out with the dispersion which has already been milled once being circulated and being milled a further 2 to 6 times by means of the high-energy mill. In this way, it is possible to obtain a dispersion having a smaller particle size and/or different distribution, for example monomodal or bimodal. Furthermore, the process can preferably be carried out with the pressure in the high-energy mill being from 2000 to 3000 bar. This measure, too, makes it possible to obtain a dispersion having a smaller particle size and/or different distribution, for example monomodal or bimodal.

The production of such a dispersion is described in the German patent application number 102004061697.3 filed on 22 Dec. 2004. The contents of this patent application are fully incorporated by reference into the present patent application.

The invention further provides a shaped body comprising aluminium oxide and zirconium dioxide and having a zirconium dioxide content of from 2 to 20% by weight, wherein the zirconium oxide
is homogeneously distributed in the shaped body,
shows tetragonal and monoclinic crystallites in the X-ray diffraction pattern, with the proportion of tetragonal phase being from 20 to 70%, and
the size of the monoclinic crystallites is from 20 to 40 nm,
the size of the tetragonal crystallites is from 30 to 50 nm.

The shaped body of the invention preferably has no microporosity in the range <10 μm.

The invention further provides a process for producing the shaped body of the invention, in which
the slip of the invention is firstly cast in a mould and dried to produce a green body and
the green body is then, after removal from the mould, sintered at temperatures from 1300° C. to 1700° C. in a gas atmosphere or under reduced pressure.

The invention further provides for the use of the slip of the invention for producing tools, construction materials and bone implants.

EXAMPLES

Analysis: The median is determined by means of dynamic light scattering. Instrument used: Horiba LB-500. The viscosity of the dispersion is determined by means of a Brookfield rotational viscometer at 23° C. as a function of the shear rate. The BET surface area is determined in accordance with DIN 66131.

Aluminium Oxide:
Powder: The aluminium oxide powder used is CT 3000 SG from Almatis GmbH. The material has a monomodal particle size distribution having a d$_{50}$ of 0.8 μm. The BET surface area is 7.5 m$^2$/g.

Dispersion 1 (D1): 3000 g of aluminium oxide powder are milled in the presence of 690 g of water, 18 g of Optapix AC95, 18 g of Dolapix CE64 and 1.2 g of Contraspum in a stirred ball mill (loading: 5000 g, milling media consisting of aluminium oxide) for 3 hours. The composition of the dispersion is shown in Table 1. The slip is passed through a 125 μm sieve before further use.

Zirconium Dioxide

Powder: A solution comprising zirconium octoate corresponding to 24.4% by weight of $ZrO_2$ and 0.3% by weight of $HfO_2$, 39.6% by weight of octanoic acid, 3.5% by weight of 2-(2-butoxyethoxy)ethanol and 32.2% by weight of petroleum spirit and a solution comprising zirconium n-propoxide corresponding to 27.8% by weight of $ZrO_2$ and 0.5% by weight of $HfO_2$, 30.5% by weight of n-propanol and 41.2% by weight of tetra-n-propoxide are mixed in a ratio of 90:10 at a temperature of 50° C. 1500 g/h of the resulting homogeneous solution are atomized in 5 standard m³/h of air by means of a nozzle having a diameter of 0.8 mm. The resulting aerosol is fed into a flame produced from hydrogen (5.0 standard m³/h) and primary air (10 standard m³/h) and burnt into a reaction space.

In addition, 20 standard m³/h of (secondary) air are introduced into the reaction space. The hot gases and the solid product are subsequently cooled in a cooling section. The powder obtained is deposited in filters.

The zirconium dioxide powder obtained has the following physicochemical properties: $ZrO_2$ content: 98.72% by weight, $HfO_2$ content: 1.28% by weight; BET surface area: 63 m²/g; monoclinic/tetragonal ratio (XRD): 64/36; tamped density: 95 g/l; loss on drying: 1.03% by weight; loss on ignition: 2.08% by weight; pH: 5.32.

Dispersion 2 (D2): 42.14 kg of deionized water and 1.75 kg of Dolapix CE64 (from Zschimmer & Schwartz) are placed in a batch vessel and the 43.9 kg of the zirconium dioxide powder prepared above are subsequently added by means of the suction hose of an Ystral Conti-TDS 3 (stator slits: 4 mm ring and 1 mm ring, rotor/stator spacing: about 1 mm) under shear conditions. After sucking-in is complete, the suction port is closed and shearing is continued at 3000 rpm for 10 minutes. This predispersion is passed five times through a Sugino Ultimaizer HJP-25050 high-energy mill at a pressure of 2500 bar using diamond nozzles having a diameter of 0.3 mm. The dispersion obtained in this way has a zirconium dioxide content of 50% by weight, a median of 112 nm and a viscosity at 100 s$^{-1}$ and 23° C. of 27 mPas. It is stable towards sedimentation, caking and thickening for at least 6 months.

Slip S1 (comparison): The aluminium oxide dispersion D1 serves as comparison. The composition is shown in Table 1.

Slip S2 (according to the invention): The zirconium dioxide dispersion (D II) is introduced with the aid of a stand stirrer into the aluminium oxide dispersion (D1). The composition is shown in Table 1.

TABLE 1

| | Slip composition | |
|---|---|---|
| | Amount of S1 (% by mass) | Amount of S2 (% by mass) |
| Aluminium oxide[a] | 100 | 89.6 |
| Water | 23 | 23 |
| Zirconium oxide dispersion D2 | — | 10.3 |
| Optapix AC 95[b] | 0.6 | 0.6 |
| Dolapix CE 64[c] | 0.6 | 0.6 |
| Contraspum | 0.04 | 0.04 |

[a] CT 3000 SG, Alcoa;
[b]
[c] Zschimmer & Schwarz;

Production of the Test Specimens

The test specimens were produced by solid casting, i.e. the slip is poured into a plaster mould and the body is formed, i.e. the plaster withdraws the water from the slip and consolidates it. The entire mould is filled bit by bit in this way; continual introduction of further slip results in formation of the finished test specimen. The test specimens are fired in an electrically heated laboratory muffle furnace. The firing curve was set according to the values in Table 2:

TABLE 2

| | Sintering curve | |
|---|---|---|
| Ramp [Wh] | Target temperature [° C.] | Hold time [h] |
| 100 | 400 | |
| 300 | 1600 | 2 |
| 300 | RT | |

Test Procedures

The sintered specimens were sawn to a size of 6×8×55 mm and ground before examination. These values were determined using EN 843-1 as a guide, with the standard providing for dimensions of 3×4×50 mm. The specimens are polished to a fineness of 20 μm, and the edges are subsequently chamfered.

The strengths of the specimens were determined in a 4-point bend test by means of a TIRA Test 2850 universal testing machine; the lower contact spacing is 40 mm and the upper contact spacing is 20 mm.

The determination of the porosity and overall density was carried out by the buoyancy method.

The Vickers hardness was determined on polished sections using an instrument from Zwick Prüftechnik GmbH. The measurements were carried out using a load of 0.5 kg, so that the hardness is reported as $HV_{0.5}$. To prepare the polished sections, the specimens are embedded in an epoxy resin and the surface is polished to a fineness of 1 μm.

The scanning electron microscopic studies were carried out using a Jeol 6460F instrument, and the elemental analysis was carried out by means of an EDX instrument from Röntec. For sample preparation, carbon was vapour-deposited on the polished sections.

The epoxy resin around the prepared polished sections was removed and the ceramic specimens were aged at 1500° C. for 1 hour. This exposes the grain boundaries around the particles and the individual constituents of the microstructure can be made very readily visible under the scanning electron microscope.

Results

Strength examination: It is found that the zirconium dioxide dispersion increases the strength of an $Al_2O_3$ ceramic.

Porosity and overall density: The two slips S1 and S2 have porosity values of less than 1.5%, so that the material can be described as "dense". The absolute values of <1.5% indicate that the porosity is in the region of the detection limit of the measurement method.

The addition of the dispersion D2 leads to an increase in the overall density. The slip S1 gives an overall density of about 3.9, and the slip S2 gives an overall density of about 4.0 g/cm³.

Determination of the hardness and evaluation of the Vickers indentations: The hardnesses of the specimens examined are very high, and their means vary within a range from 17 to 19 GPa. Furthermore, the addition of the nanosize zirconium dioxide particles (slip S2) leads to an increase in the absolute hardness and a slight reduction in the range of variation compared to slip S1. This effect is not known for microsize zirconium dioxide particles. Here, the addition of microsize zirconium dioxide particles leads to a reduction in the hardness of the total microstructure.

The shaped body obtained from the slip S1 has significantly longer cracks than the shaped body obtained from slip S2.

Examination of microstructure: Transmission electron micrographs show that the shaped body obtained from the slip S2 is very densely sintered. Furthermore, no large pores can be seen. The shaped body obtained from the slip S1, on the other hand, displays a significant microporosity in the range <10 μm. The zirconium dioxide particles are very homogeneously distributed in the microstructure. They are located predominantly in the interstices between the aluminium oxide particles. The zirconium dioxide particles are monoclinic and tetragonal crystallites. Quantitative phase analysis of the zirconium dioxide indicates that the monoclinic/tetragonal ratio in the shaped body obtained from the slip S2 is essentially the same as that in the slip S2 itself.

It is found that the size of the aluminium oxide particles in the shaped body obtained from the slip S2 is significantly smaller than in the shaped body S1 obtained from the slip S1. The nanosize zirconium dioxide powder in the slip S2 according to the invention acts as growth inhibitor for the aluminium oxide particles. This effect correlates very well with the properties found, viz. higher strength combined with higher hardness and smaller cracks in the micrographs of the Vickers hardness. The intercalated zirconium dioxide particles also lead to stressing of the microstructure, as a result of which cracks in the microstructure cannot propagate easily. This in turn improves the strength and the hardness.

The invention claimed is:

1. A slip comprising:
   a liquid phase;
   at least one aluminum oxide powder and
   at least one zirconium dioxide powder, wherein
   a) the at least one zirconium dioxide powder consists of zirconium dioxide powder which
      is not stabilized,
      comprises no or an insufficient amount of Y, Ca, Mg or titanium to produce a stabilizing effect,
      has a mean particle diameter of less than 300 nm,
      shows only a monoclinic phase and a tetragonal phase in the X-ray diffraction pattern, with the proportion of the tetragonal phase at room temperature being from 20 to 70%, and
      is present in a proportion of from 2 to 20% by weight, based on the total weight of the zirconium dioxide and the aluminum oxide,
   b) the aluminum oxide powder
      i) has a mean particle diameter of more than 300 nm and
      ii) is present in a proportion of from 80 to 98% by weight, based on the total weight of the zirconium dioxide and the aluminum oxide amount of the slip, and
   c) the solids content, as the sum of aluminum oxide and zirconium dioxide, is from 50 to 85% by weight, based on the total amount of the slip.

2. The slip according to claim 1, wherein the mean diameter of the zirconium dioxide particles is from 70 to 200 nm.

3. The slip according to claim 1, wherein the zirconium dioxide powder comprises aggregated primary particles.

4. The slip according to claim 1, wherein a BET surface area of the zirconium dioxide powder is $60\pm15$ m$^2$/g.

5. The slip according to claim 1, wherein the zirconium dioxide powder is free of pores.

6. The slip according to claim 1, wherein an upper limit to a mean diameter of the aluminium oxide particles is 20 μm.

7. The slip according to claim 1, wherein a BET surface area of the aluminium oxide powder is from 0.1 to 15 m$^2$/g.

8. The slip according to claim 1, wherein the aluminum oxide powder comprises at least 95% by weight of an alpha-aluminium oxide.

9. The slip according to claim 1, wherein the liquid phase is water.

10. The slip according to claim 1, further comprising:
   up to 10% by weight of pH-regulating additives and/or surface-modifying additives.

11. A process for producing the slip according to claim 1 comprising:
   a) dispersing in a first liquid phase zirconium dioxide powder having a mean particle diameter of less than 300 nm resulting in a dispersion having a zirconium dioxide content of from 30 to 75% by weight and optionally containing up to 10% by weight of pH-regulating additives and/or surface-active additives,
   b) dispersing in a second liquid phase aluminum oxide powder having a mean particle diameter of more than 300 nm resulting in a dispersion having an aluminum oxide content of from 70 to 90% by weight and optionally containing up to 10% by weight of pH-regulating additives and/or surface-active additives, and
   c) adding continuously or in portions under dispersing conditions the dispersion resulting from step a) to the dispersion resulting from step b),
   wherein the amounts of aluminum oxide and zirconium dioxide are selected so that the ratio of zirconium dioxide to aluminum oxide is from 2:98 to 20:80, and the solids content, as the sum of aluminum oxide and zirconium dioxide, is from 50 to 85% by weight, based on the total amount of the slip.

12. The slip according to claim 1, further comprising hafnium dioxide.

13. The slip according to claim 12, wherein a content of hafnium dioxide by weight is 2.5% or less.

* * * * *